(12) United States Patent
Sung (10) Patent No.: US 8,060,103 B2
(45) Date of Patent: Nov. 15, 2011

(54) APPARATUS AND METHOD FOR OPERATING BROADCAST MESSAGE IN BROADBAND WIRELESS COMMUNICATION SYSTEM

(75) Inventor: Ki-Won Sung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1035 days.

(21) Appl. No.: 11/985,187

(22) Filed: Nov. 14, 2007

(65) Prior Publication Data

US 2008/0113680 A1 May 15, 2008

(30) Foreign Application Priority Data

Nov. 14, 2006 (KR) .................. 10-2006-0112027

(51) Int. Cl.
*H04W 88/02* (2009.01)
(52) U.S. Cl. ..................... 455/446; 455/512
(58) Field of Classification Search ............. 455/15, 455/67.13, 422.1, 101, 114.3, 512, 436–447; 370/241, 260, 312, 315, 370, 329, 335; 375/146
See application file for complete search history.

(56) References Cited

U.S. PATENT DOCUMENTS

| | | | |
|---|---|---|---|
| 5,740,166 A * | 4/1998 | Ekemark et al. | 370/331 |
| 6,298,219 B1 * | 10/2001 | Patronen et al. | 455/424 |
| 6,400,951 B1 * | 6/2002 | Vaara | 455/436 |
| 2001/0031639 A1 * | 10/2001 | Makipaa | 455/450 |
| 2004/0264507 A1 * | 12/2004 | Cho et al. | 370/480 |
| 2005/0202828 A1 | 9/2005 | Pecen et al. | |
| 2010/0067455 A1 * | 3/2010 | Lee et al. | 370/329 |

FOREIGN PATENT DOCUMENTS

| KR | 1020050017514 A | 2/2005 |
|---|---|---|
| KR | 1020060008986 A | 1/2006 |
| KR | 1020060008989 A | 1/2006 |

OTHER PUBLICATIONS

Office Action dated Nov. 19, 2009 in connection with Korean Patent Application No. 10-2006-0112027.

* cited by examiner

*Primary Examiner* — Diane Mizrahi (57) ABSTRACT

Provided is an apparatus and method for transmitting neighbor base station information in a broadband wireless communication system. In the method, the priorities of subcells included in neighbor base stations that use at least one frequency allocation are determined. Subcells are selected among the subcells according to the determined priorities, information about which is to be transmitted to mobile stations located in a coverage area. Information about the selected subcells is transmitted to the mobile stations. Thus, the amount of resource for transmission of the neighbor base station information can be reduced. Therefore, the available resource of the downlink can be increased and the amount of a scan operation of the mobile station can be reduced.

24 Claims, 5 Drawing Sheets

|      | BS1    | BS2    | BS3    | BS4    | BS5    |            |
|------|--------|--------|--------|--------|--------|------------|
| FA1  | 0.81   | 0.11   | 0.64   | 0.31   | 0.61   | SUM = 2.48 |
| FA2  | 0.95   | 0.13   | 0.77   | 0.25   | 0.54   | SUM = 2.64 |
| FA3  | 0.70   | 0.17   | 0.54   | 0.32   | 0.47   | SUM = 2.20 |

FIG.5A

|      | BS1    | BS2    | BS3    | BS4    | BS5    |            |
|------|--------|--------|--------|--------|--------|------------|
| FA1  | 0.81   | 0.11   | 0.64   | 0.31   | 0.61   | SUM = 2.48 |
| FA2  | 0.95   | 0.13   | 0.77   | 0.25   | 0.54   | SUM = 2.64 |
| FA3  | ~~0.70~~ | ~~0.17~~ | ~~0.54~~ | ~~0.32~~ | ~~0.47~~ | ~~SUM = 2.20~~ |

FIG.5B

|      | BS1    | BS2    | BS3    | BS4    | BS5    |            |
|------|--------|--------|--------|--------|--------|------------|
| FA1  | 0.81   | 0.11   | 0.64   | 0.31 | 0.61   | SUM = 2.48 |
| FA2  | 0.95   | 0.13 | 0.77 | 0.25   | 0.54   | SUM = 2.64 |
| FA3  | ~~0.70~~ | ~~0.17~~ | ~~0.54~~ | ~~0.32~~ | ~~0.47~~ | ~~SUM = 2.20~~ |

FIG.5C

APPARATUS AND METHOD FOR OPERATING BROADCAST MESSAGE IN BROADBAND WIRELESS COMMUNICATION SYSTEM

CROSS-REFERENCE TO RELATED APPLICATION(S) AND CLAIM OF PRIORITY

This application claims priority under 35 U.S.C. §119 to an application filed in the Korean Intellectual Property Office on Nov. 14, 2006 and allocated Serial No. 2006-112027, the contents of which are incorporated herein by reference.

TECHNICAL FIELD OF THE INVENTION

The present invention relates generally to an apparatus and method for transmitting neighbor base station (BS) information in a broadband wireless communication system, and in particular, to an apparatus and method for reducing the size of a broadcast message for transmission of neighbor BS information in a broadband wireless communication system.

BACKGROUND OF THE INVENTION

A broadband wireless communication system supports the mobility of a mobile station (MS) through a handover. The MS must know information about neighbor base stations (hereinafter referred to as neighbor BS information) in order to perform a handover. Thus, a serving BS transmits neighbor BS information to the MS. For example, the serving BS collects neighbor BS information through a backbone. Thereafter, using a broadcast message, the serving BS broadcasts the neighbor BS information to mobile stations located in a coverage area.

Base stations of the broadband wireless communication system can use a plurality of frequency allocations (FAs). In this case, the BS supports the mobility of an MS through an intra-FA handover and an inter-FA handover. The intra-FA handover is a handover of an MS from an in-use FA of a serving BS to one of the frequency allocations of a neighbor BS that is identical to the in-use FA.

In order to support an intra-FA handover and an inter-FA handover, the serving BS must transmit information about all subcells of neighbor base stations to the MS. The subcell is a service area that receives a service through one of the frequency allocations used by a BS.

When a serving BS generates a broadcast message in order to transmit information about all subcells of neighbor base stations to an MS, there is an increase in overhead due to the broadcast message. For example, when M neighbor base stations use one FA in a broadband wireless communication system, the serving BS generates a broadcast message containing information about M base stations. However, when M neighbor base stations use N frequency allocations, the serving BS generates a broadcast message containing information about M×N subcells.

Moreover, because the serving BS transmits the broadcast message at the lowest data rate, the size of the broadcast message further increases, leading to a decrease in the available resources for transmission of downlink data.

The MS detects information about neighbor subcells using the broadcast message received from the serving BS. Thereafter, the MS scans subcells that use FAs different from the FA of the MS. However, if the serving BS broadcasts information about all subcells of neighbor base stations, the MS must scan too many subcells, leading to a service interruption.

SUMMARY OF THE INVENTION

To address the above-discussed deficiencies of the prior art, it is a primary object of the present invention to substantially solve at least the above problems and/or disadvantages and to provide at least the advantages below. Accordingly, an object of the present invention is to provide an apparatus and method for reducing the amount of neighbor base station information in a broadband wireless communication system.

Another object of the present invention is to provide an apparatus and method for reducing the size of a broadcast message for transmission of neighbor base station information in a broadband wireless communication system.

Still another object of the present invention is to provide an apparatus and method for controlling the number of subcells contained in a broadcast message when a plurality of frequency allocations are used in a broadband wireless communication system.

According to one aspect of the present invention, a method for transmitting neighbor base station information from a base station in a wireless communication system includes the steps of: determining the priorities of subcells included in neighbor base stations that use at least one frequency allocation; selecting subcells among the subcells according to the determined priorities, information about which is to be transmitted to mobile stations located in a coverage area; and transmitting information about the selected subcells to the mobile stations.

According to another aspect of the present invention, a transmitter apparatus for transmitting neighbor base station information in a wireless communication system includes: a priority determiner for determining the priorities of subcells included in neighbor base stations that use at least one frequency allocation; a message list generator for selecting subcells among the subcells according to the determined priorities, information about which is to be transmitted to mobile stations located in a coverage area; and a transmitter unit for transmitting information about the selected subcells to the mobile stations.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Hereinafter, a description is given of a scheme for reducing neighbor base station information in a broadband wireless communication system according to the present invention.

The following description is made on the assumption that a base station (BS) uses a broadcast message to transmit neighbor base station (BS) information to mobile stations located in a coverage area. The BS reduces the size of the broadcast message by controlling the number of subcells contained in the broadcast message. The subcell is a service area that receives a service through one of the frequency allocations used by a base station.

The present invention is also applicable to cases where other schemes are used to transmit neighbor BS information from the BS.

In the case where a broadcast message is used to transmit neighbor BS information, the BS generates a broadcast message containing neighbor BS information for each frequency allocation (FA) and broadcasts the broadcast message to a coverage area.

The following description is made in the context of a Time Division Duplex-Orthogonal Frequency Division Multiple Access (TDD-OFDMA) wireless communication system, to which the present invention is not limited. Thus, it is to be clearly understood that the present invention is applicable to any other multiple access scheme.

Figure 1:
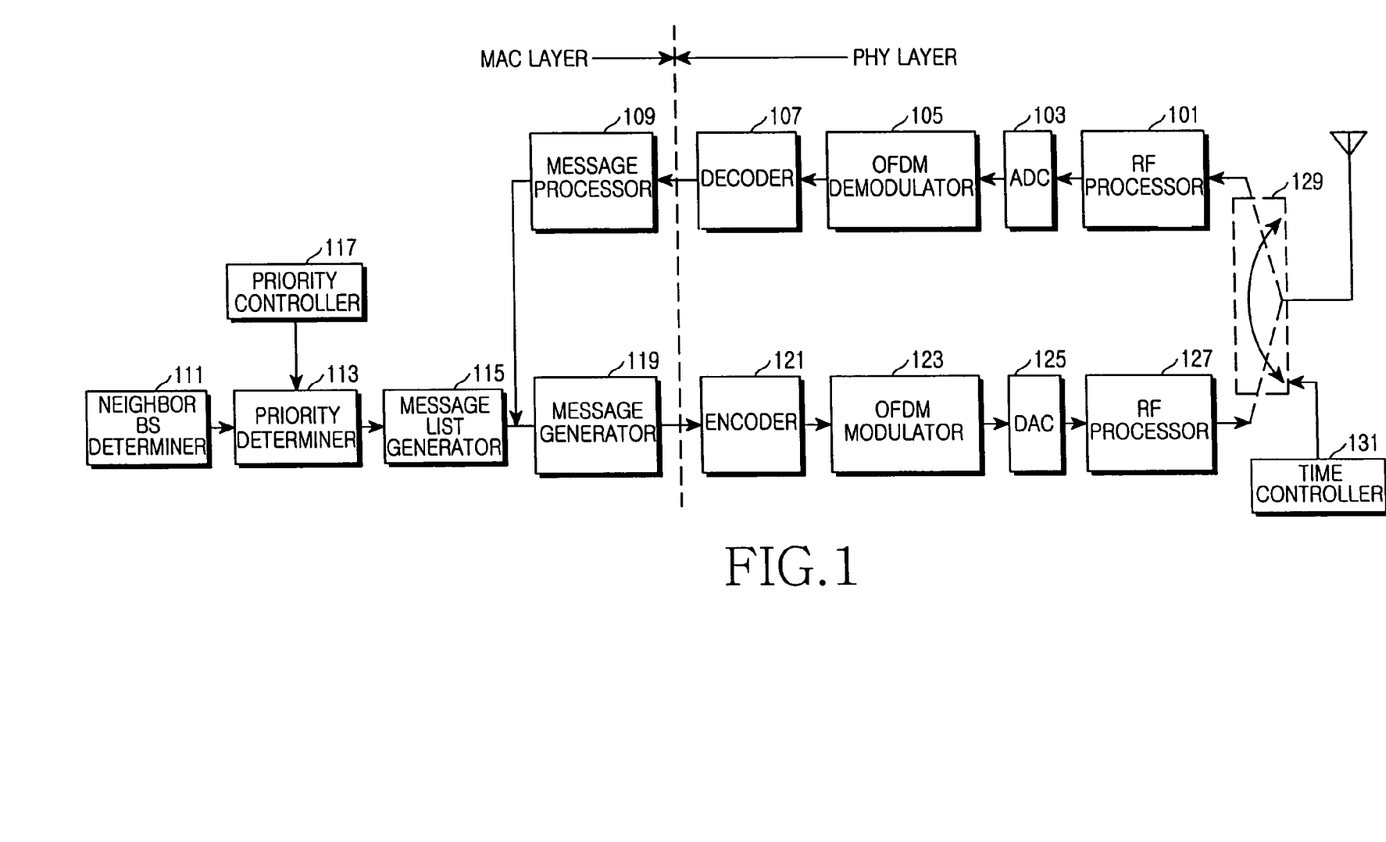
FIG. 1 is a block diagram of a BS in a broadband wireless communication system according to the present invention.

FIG. 1 is a block diagram of a base station (BS) in a broadband wireless communication system according to the present invention.

Referring to FIG. 1, the BS includes a receiver, a transmitter, a radio frequency (RF) switch 129, and a time controller 131.

Under the control of the time controller 131, the RF switch 129 switches the connections of an antenna to the transmitter (TX) and the receiver (RX) depending on TX/RX sections so that the transmitter and the receiver can share the antenna. For example, in the RX section, the RF switch 129 connects the antenna to an RF processor 101 of the receiver under the control of the time controller 131. In the TX section, the RF switch 129 connects the antenna to an RF processor 127 of the transmitter under the control of the time controller 131.

The time controller 131 controls the switching operation of the RF switch 129 based on frame synchronization.

The receiver includes the RF processor 101, an analog-to-digital converter (ADC) 103, an OFDM demodulator 105, a decoder 107, and a message processor 109.

The RF processor 101 down-converts an RF signal, received through the antenna, into a baseband analog signal. The ADC 103 converts the baseband analog signal, received from the RF processor 101, into time-domain sample data. The OFDM demodulator 105 Fast Fourier Transform (FFT)-processes the time-domain sample data, received from the ADC 103, into frequency-domain data.

The decoder 107 selects data of desired subcarriers from the frequency-domain data received from the OFDM demodulator 105. The decoder 107 demodulates and decodes the selected data in accordance with a predetermined Modulation and Coding Scheme level.

The message processor 109 analyzes and detects a control message received from the decoder 107. For example, the message processor 109 analyzes a message of a neighbor BS, received through a backbone network, to detect information about all subcells of the neighbor BS, and transmits the detected information to the message generator 119 of the transmitter.

The transmitter includes a neighbor BS determiner 111, a priority determiner 113, a message list generator 115, a priority controller 117, a message generator 119, an encoder 121, an OFDM modulator 123, a digital-to-analog converter (DAC) 125, and the RF processor 127.

Using neighbor BS information collected through a backbone, the neighbor BS determiner 111 generates a set of neighbor base stations to which mobile stations located in a coverage area can perform a handover.

The priority determiner 113 determines the priorities of all subcells of the neighbor BS set generated by the neighbor BS determiner 111. For example, the priority determiner 113 determines the priorities of all subcells of the neighbor BS set based on the traffic states and the propagation characteristics of the subcells and the FA policy of the wireless communication system, which are reported from the priority controller 117.

Based on the subcell priorities determined by the priority determiner 113, the message list generator 115 determines a subcell list to be contained in a broadcast message for transmission of neighbor BS information. For example, the message list generator 115 selects a subcell list so that at least one subcell is included for each of the neighbor base stations included in the neighbor BS set. Thereafter, the message list generator 115 selects a predetermined number of subcells in descending order of the determined subcell priorities.

The message generator 119 generates a broadcast message containing information about subcells corresponding to the message list received from the message list generator 115.

The encoder 121 encodes and modulates the broadcast message, received from the message generator 119, in accordance with a predetermined MCS level. The broadcast message must be broadcast to the entire coverage area. Therefore, the broadcast message is encoded and modulated so that it is transmitted at the lowest data rate.

The OFDM modulator 123 Inverse Fast Fourier Transform (IFFT)-processes encoded frequency-domain data, received from the encoder 121, into sample data (OFDM symbols).

The DAC 125 converts the sample data into an analog signal. The RF processor 127 up-converts the analog signal, received from the DAC 125, into an RF signal, and transmits the RF signal through the antenna.

Figure 2:
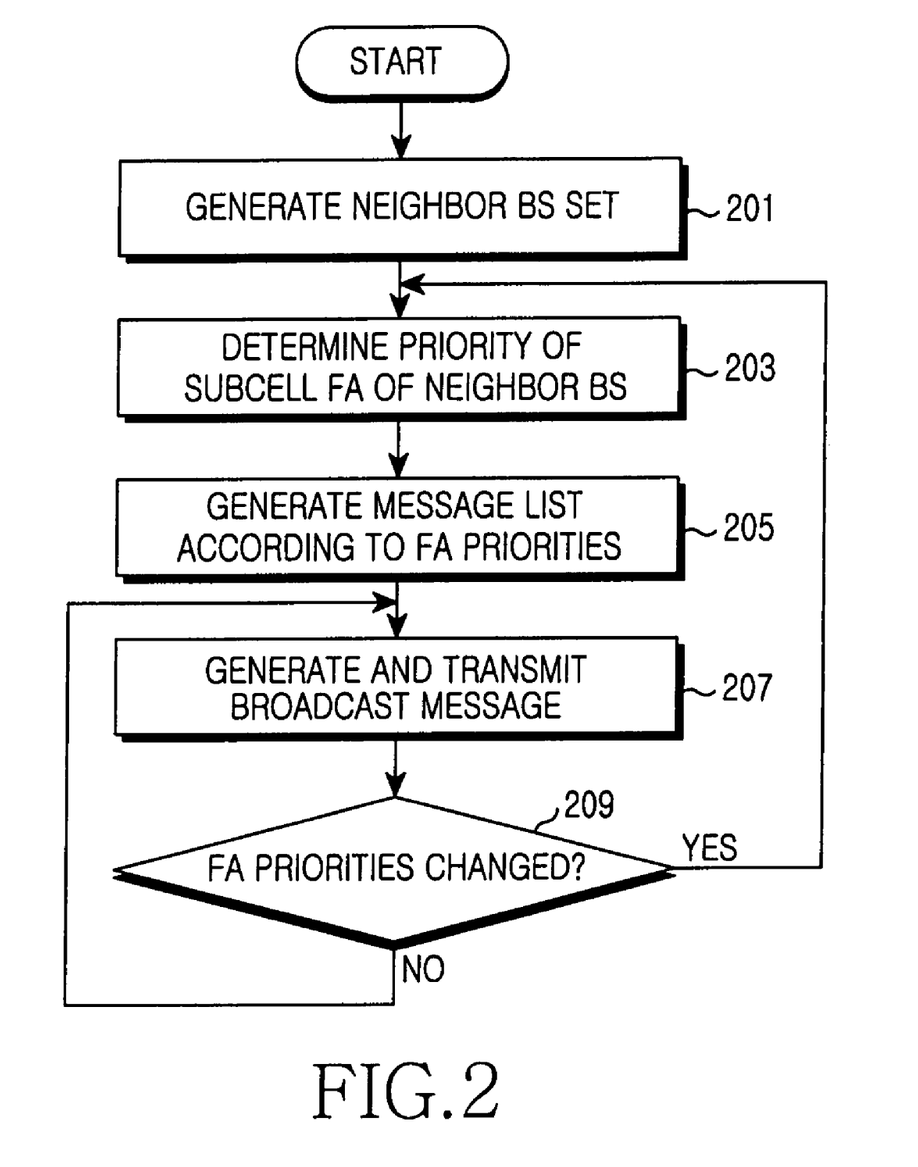
FIG. 2 is a flowchart illustrating a procedure for generating a broadcast message in a broadband wireless communication system according to an embodiment of the present invention.

FIG. 2 is a flowchart illustrating a procedure for generating the broadband wireless communication system according to an embodiment of the invention.

Referring to FIG. 2, in step 201, the BS collects information about neighbor base stations through a backbone network and generates a set of neighbor base stations to which mobile stations located in a coverage area can perform a handover.

In step 203, the BS determines the priorities of all subcells of the generated neighbor BS set. For example, in FIG. 3, the BS determines the priorities of the subcells based on the traffic states and the propagation characteristics of the subcells and the FA policy of the wireless communication system.

In step 205, based on the determined subcell priorities, the BS determines a subcell list to be contained in a broadcast message for transmission of neighbor BS information. For example, in FIG. 4, the BS selects a subcell list so that at least one subcell is included for each neighbor base station in the neighbor BS set. Thereafter, the BS selects a predetermined number of subcells in descending order of the determined subcell priorities.

In step 207, the BS generates a broadcast message containing information about the determined subcells and transmits the generated broadcast message to the coverage area. For example, the BS collects information about the subcells of the neighbor base stations through a backbone network.

In step 209, the BS determines whether the priorities of the subcells are changed. For example, the BS determines whether parameters (e.g., FA policies, propagation characteristics, traffic states) for determination of subcell priorities are changed.

If the parameters for determination of the subcell priorities are changed (in step 209), the BS returns to step 203 in order to redetermine the priorities of the subcells.

On the other hand, if the parameters for determination of the subcell priorities are not changed (in step 209), the BS returns to step 207 in order to generate and transmit the broadcast message using the determined subcells.

As described above, the BS transmits a broadcast message including subcell information of neighbor base stations to mobile stations. The BS transmits subcell information of neighbor base stations through a broadcast message even while a service is being provided from the BS to the mobile stations. Thus, while providing a service to the mobile stations, the BS continuously determines the subcell list contained in the broadcast message.

Figure 3:
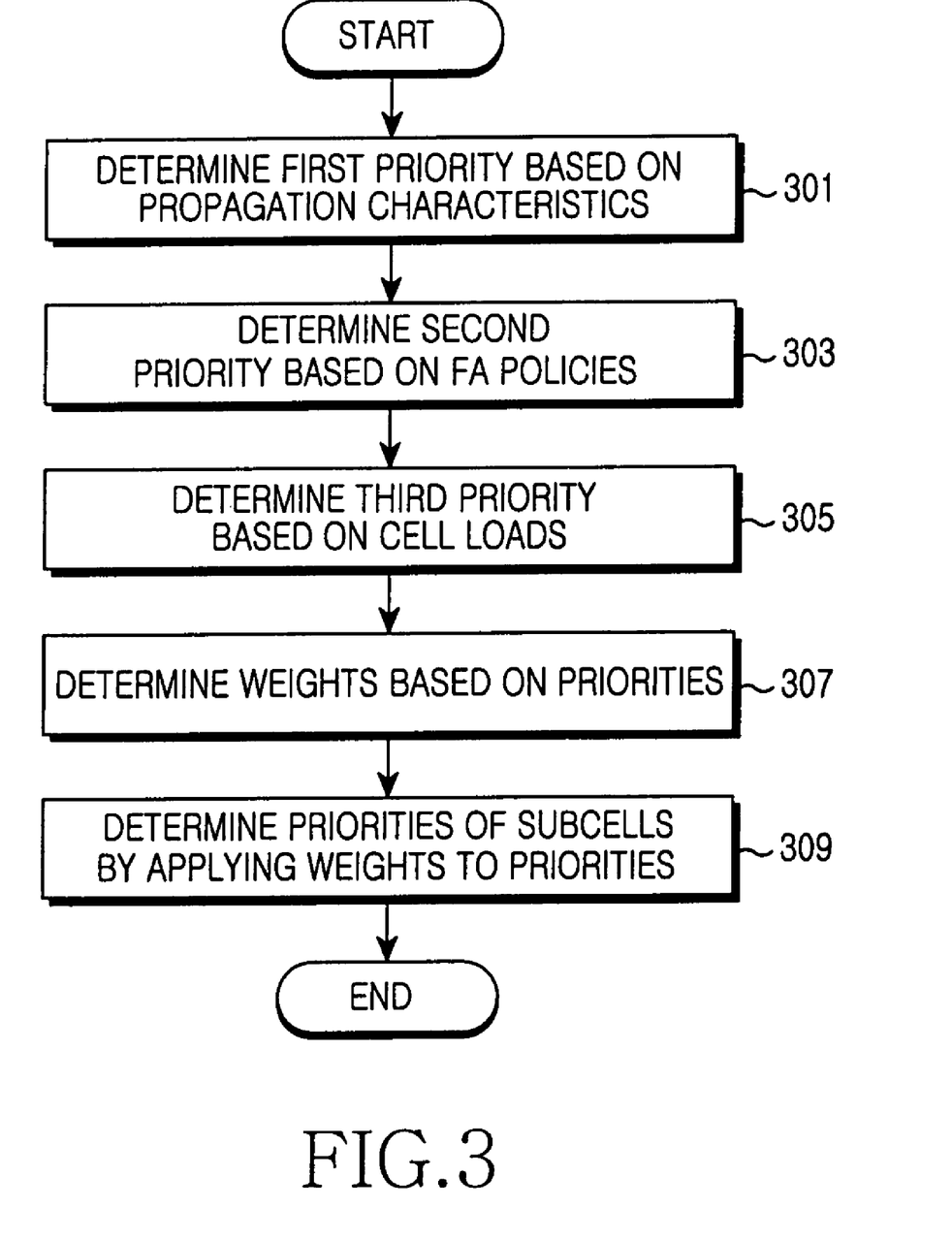
FIG. 3 is a flowchart illustrating a procedure for determining the priorities of FAs in a broadband wireless communication system according to an embodiment of the present invention.

FIG. 3 is a flowchart illustrating a procedure for determining the priorities of frequency allocations in the broadband wireless communication system according to an embodiment of the present invention. In the following description, the priorities are denoted by real numbers ranging from 0 to 1. Also, the determination order of the first priority, the second priority and the third priority is variable.

In FIG. 3, in step 301, the base station determines the first priority based on the propagation characteristics of all subcells included in a neighbor BS set. For example, the BS measures the strengths of signals received from the subcells, and assigns the higher priority to the subcell of the stronger signal.

In step 303, the BS determines the second priority for the subcells based on the FA policies of the wireless communication system. For example, if the wireless communication system gives priority to an intra-FA handover of an MS, the BS assigns the second priority of 1.0 to subcells that use an FA identical to an FA for transmission of a broadcast message. On the other hand, the BS assigns the second priority of 0.5 to subcells that use FAs different from the FA for transmission of the broadcast message. If most resources of a predetermined FA are allocated to a Multicast and Broadcast Service (MBS), the BS assigns the low second priority of 0.2 to a subcell that uses an FA for the MBS. The FA policies may vary depending on communication service provides. Thus, the BS may apply the second priority differently depending on the communication service providers.

In step 305, the BS determines the third priority of the subcells based on the cell loads of the subcells received from neighbor base stations through the backbone network. For example, the BS assigns the higher priority to the subcell with the smaller cell load. The cell load is the ratio of the actually used resource to the entire radio resource of the subcell.

In step 307, using the first, second and third priorities, the BS determines weights for determination of the priorities of the subcells. For example, the BS determines weights for determination of the priorities of the subcells depending on the policies of service providers. For example, the BS determines the priorities of the subcells by applying weights $\alpha$, $\beta$, $\gamma$, which are determined depending on the policies of service providers, to the first, second and third priorities, as expressed in Equation 1:

$$P_{ij} = \alpha PW_{ij} + \beta PF_{ij} + \gamma PT_{ij}, \ (\alpha+\beta+\gamma=1) \qquad \text{[Eqn. 1]}$$

In Equation 1, $P_{ij}$ is the priority of a subcell using an FA j in the $i^{th}$ neighbor BS, $PW_{ij}$ is the first priority determined according to the FA policy of a service provider, $PF_{ij}$ is the second priority determined according to the propagation characteristics of the subcells, $PT_{ij}$ is the third priority determined according to the cell loads of the subcells, and $\alpha$, $\beta$, $\gamma$ are weights depending on the policy of the service provider.

For example, if the service provider desires to dynamically change the subcells contained in the broadcast message, the BS sets the weight $\gamma$ for the third priority to be large in Equation 1. On the other hand, if the service provider desires to change the subcells of the broadcast message according to a change in the propagation environment or the FA policy, the BS sets the weights $\alpha$, $\beta$ for the first and second priorities to be large in Equation 1.

In step 309, the BS determines the priorities of the subcells by applying the weights of the priorities to Equation 1.

Thereafter, the BS ends the procedure.

In the above-described embodiment, the BS determines the priorities of the subcells using parameters such as the FA policy of the wireless communication system, the propagation characteristics of the subcells, and the cell loads of the subcells.

In other embodiments, the BS may determine the priorities of the subcells using only some of the parameters (the FA policy, the propagation characteristics, and the cell loads). Also, the BS may determine the priorities of the subcells using another parameter that indicates the operation state of the subcell. For example, the BS may assign the higher priority to subcells that use the FA for transmission of the broadcast message than to subcells that use another FA.

Figure 4:
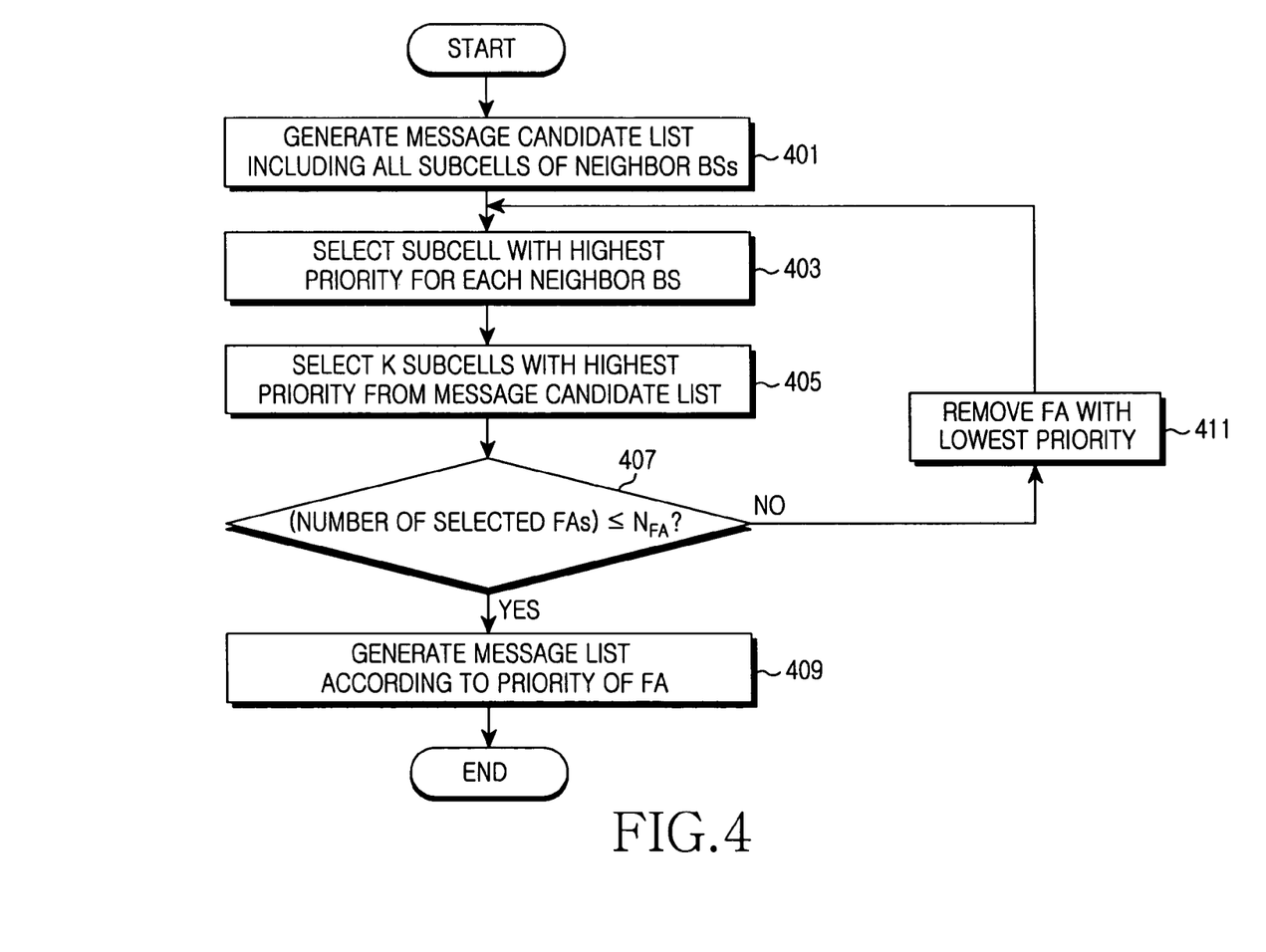
FIG. 4 is a flowchart illustrating a procedure for generating a message list in a broadband wireless communication system according to an embodiment of the present invention.

FIG. 4 is a flowchart illustrating a procedure for generating a message list in the broadband wireless communication system according to an embodiment of the present invention. The following description is made on the assumption that the BS generates a broadcast message containing information about $N_s$ subcells and $N_{FA}$ frequency allocations. The value, $N_s$, is larger than or equal to the number of neighbor base stations included in the neighbor BS set.

Figure 5A:
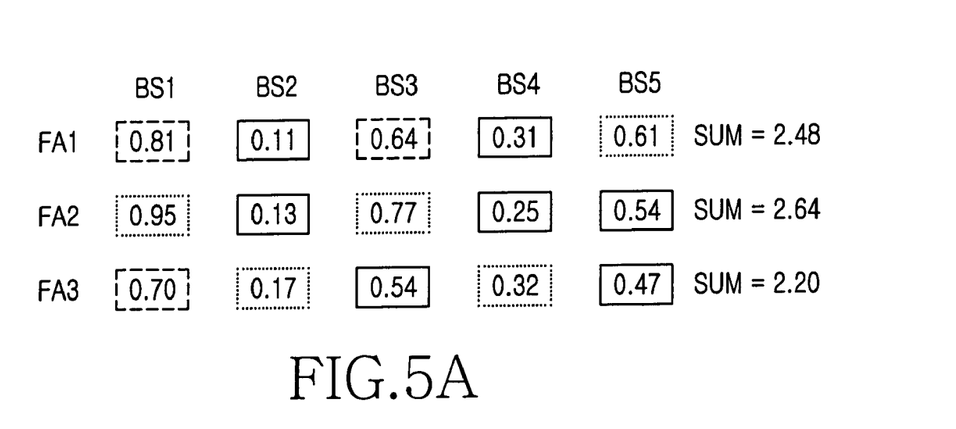
FIGS. 5A to 5C are diagrams illustrating message lists in a broadband wireless communication system according to an embodiment of the present invention.
Figure 5B:
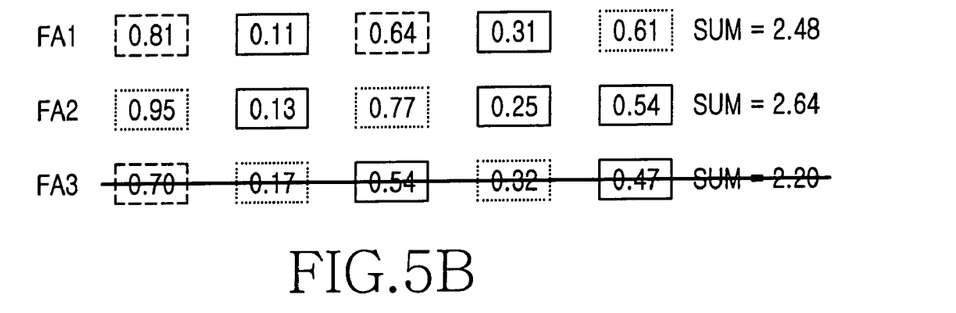
Figure 5C:
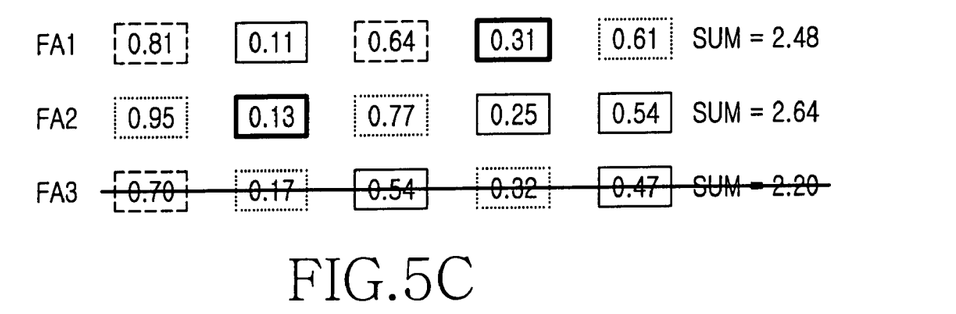

Referring to FIG. 4, in step 401, the BS generates a message candidate list including all subcells of neighbor base stations to which mobile stations located in a coverage area can perform a handover. For example, if 5 neighbor base stations are included in the neighbor BS list and the neighbor base stations use 3 FAs, the BS generates a message candidate list including 15 subcells as illustrated in FIG. 5A. FIGS. 5A to 5C are diagrams illustrating message lists in the broadband wireless communication system according to an embodiment of the present invention. In FIGS. 5A to 5C, it is assumed that a broadcast message for the first FA is generated.

In step 403, the BS detects the priorities of the subcells to select the subcell with the highest priority for each of the neighbor base stations. For example, the BS selects the subcell with the highest priority for each of the neighbor base stations, which is represented by red color, as illustrated in FIG. 5(a). At this point, the BS removes the selected subcells from the message candidate list.

In step 405, in descending order of priority, the BS selects K subcells from the message candidate list from which the selected subcells have been removed. The K is the number of all subcells in the broadcast message minus the number of subcells selected in step 403 (K=$N_s$−(the number of the selected subcells)).

Thereafter, the BS removes the selected subcells from the message candidate list. For example, when the total number $N_s$ of subcells to be included in the broadcast message is 8, the BS selects, in descending order of priority, 3 subcells represented by blue color from the message candidate list, from which the subcells represented by red color have been removed. That is, 5 subcells are selected from 8 subcells of the broadcast message in step 403, and 3 subcells are selected from the message candidate list in descending order of priority.

In step 407, the BS determines if all of FAs used by the selected subcells can be included in the broadcast message. That is, the BS compares the number T of FAs used by the selected subcells with the maximum number $N_{FA}$ of FAs that can be included in the broadcast message.

If the number T is larger than the maximum number $N_{FA}$ (T>$N_{FA}$) in step 407, the BS proceeds to step 411 to detect the priorities of FAs used by the selected subcells.

Thereafter, the BS removes the FA with the lowest priority. At this point, the BS removes subcells, which use the FA to be removed, among the selected subcells. For example, in FIG. 5B, the selected subcells are included in 3 FAs. If the $N_{FA}$ is 2, because the number of FAs used by the selected subcells is 3, the BS detects the priorities of the FAs and removes the third FA with the lowest priority.

Thereafter, the BS returns to step 403 to determine whether at least one subcell is selected for each of the neighbor base stations.

If there are neighbor base stations having no subcell selected, the BS selects the subcell with the highest priority for each of the neighbor base stations having no subcell selected. For example, as illustrated in FIG. 5C, if the second BS and the third BS have no subcell selected, the BS selects one subcell with the highest priority, which is represented by pink color in the second and third base stations. Thereafter, as illustrated in FIG. 5C, if the number of the selected subcells is smaller than $N_s$, the BS selects K (=$N_s$−(the number of the selected subcells)) subcells from the message candidate list in descending order of priority, which are represented by violet color.

On the other hand, if the number T is smaller than or equal to the maximum number $N_{FA}$ (T≦$N_{FA}$) in step 407, the BS generates a message list for generation of the broadcast message by using the selected subcell list, in step 409.

Thereafter, the BS ends the procedure.

The above description has been made in the context of the BS using a plurality of FAs in the broadband wireless communication system, to which the present invention is not limited. Thus, it is to be clearly understood that the present invention is also applicable to the case where the BS includes a plurality of sectors.

In accordance with the present invention described above, information about only some subcells with high priorities, among subcells included in the neighbor BS, is transmitted to mobile stations. Thus, the amount of resource for transmission of the neighbor BS information can be reduced. Therefore, the available resource of the downlink can be increased and the amount of a scan operation of the MS can be reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a base station for transmitting neighbor base station information in a wireless communication system, the method comprising:
   determining priorities of subcells included in neighbor base stations that use at least one frequency allocation;
   selecting candidate subcells from the subcells according to the determined priorities, information about which is to be transmitted to mobile stations located in a coverage area; and
   transmitting information about the candidate subcells to the mobile stations.

2. The method of claim 1, wherein the subcells comprise respective areas of the neighbor base stations that use different frequency allocations.

3. The method of claim 1, wherein selecting candidate subcells according to the determined priorities comprises selecting the information about the candidate subcells for each of frequency allocations used by the base station.

4. The method of claim 1, wherein determining the priorities of the subcells comprises determining the priorities of the subcells based on at least one of a frequency allocation policy of the wireless communication system, receive signal strengths of the subcells, cell loads of the subcells, and information about a frequency allocation for transmission of the information about the candidate subcells.

5. The method of claim 1, wherein determining the priorities of the subcells comprises:
   detecting information about a frequency allocation for transmitting the information about the candidate subcells; and
   assigning the higher priority to subcells that use a frequency allocation substantially identical to the frequency allocation for transmitting the information about the candidate subcells than to a subcell that uses a different frequency allocation.

6. The method of claim 1, wherein determining the priorities of the subcells comprises:
   determining a first priority based on receive signal strengths of the subcells;
   determining a second priority based on a frequency allocation policy of the wireless communication system;
   determining a third priority based on cell loads of the subcells;
   calculating respective weights to be applied to the first priority, the second priority and the third priority; and determining the priorities of the subcells based on the calculated weights to the first priority, the second priority and the third priority.

7. The method of claim 6, wherein determining the first priority comprises:
measuring the receive signal strengths of the subcells; and
assigning a higher priority to a subcell with a stronger receive signal.

8. The method of claim 6, wherein determining the second priority comprises:
detecting the frequency allocation policy of the wireless communication system; and
assigning a higher priority to a subcell that uses a frequency allocation substantially identical to the frequency allocation for transmitting the information about the candidate subcells when priority is given to frequencies in an intra-frequency allocation handover.

9. The method of claim 6, wherein determining the third priority comprises:
detecting the cell loads of the subcells; and
assigning a higher priority to a subcell with a lower cell load.

10. The method of claim 6, wherein calculating the respective weights to be applied comprises determining the respective weights according to a service policy of a communication service provider.

11. The method of claim 1, wherein determining the priorities of the subcells comprises, when a predetermined frequency allocation supports a Multicast and Broadcast Service (MBS), assigning a lower priority to a subcell that uses the predetermined frequency allocation.

12. The method of claim 1, wherein selecting the candidate subcells comprises:
selecting one subcell with a highest priority for each of the neighbor base stations; and
selecting at least one subcell among the remaining subcells, in descending order of priority such that a total number of selected subcells is not greater than a predetermined number.

13. The method of claim 12, further comprising:
comparing a number of frequency allocations used by the candidate subcells with a maximum number of frequency allocations transmittable to the mobile stations located in the coverage area; and
removing a frequency allocation with a lowest priority among the frequency allocations used by the candidate subcells if the number of the frequency allocations used by the candidate subcells is larger than the maximum number of the frequency allocations transmittable to the mobile stations,
wherein selecting at least one subcell among the remaining subcells such that the total number of selected subcells is not greater than the predetermined number comprises:
determining whether at least one subcell is selected for each of the neighbor base stations, and
selecting at least one subcell among the remaining subcells such that the total number of selected subcells is not greater than the predetermined number if at least one subcell is selected for each of the neighbor base stations.

14. The method of claim 13, further comprising:
if there is a neighbor base station having no subcell selected, selecting a subcell with the highest priority from the neighbor base station having no subcell selected; and
removing at least one subcell with the lowest priority among the candidate subcells if the total number of subcells is greater than the predetermined number.

15. The method of claim 1, wherein transmitting the information about the candidate subcells to the mobile stations comprises:
generating a broadcast message including the information about the candidate subcells; and
broadcasting the generated broadcast message to the coverage area.

16. The method of claim 1, further comprising:
determining whether the priorities of the subcells are changed after the transmission of the information about the candidate subcells; and
if the priorities of the subcells are changed, redetermining the priorities of the subcells.

17. The method of claim 16, wherein determining whether the priorities of the subcells are changed comprises determining whether at least one of a frequency allocation policy of the wireless communication system, receive signal strengths of the subcells, and cell loads of the subcells is changed.

18. A base station for transmitting neighbor base station information in a wireless communication system, the base station comprising:
a priority determiner for determining priorities of subcells included in neighbor base stations that use at least one frequency allocation;
a message list generator for selecting candidate subcells from the subcells according to the determined priorities, information about which is to be transmitted to mobile stations located in a coverage area; and
a transmitter unit for transmitting the information about the candidate subcells to the mobile stations.

19. The base station of claim 18, wherein the subcells comprise respective areas of the neighbor base stations that use different frequency allocations.

20. The base station of claim 18, wherein the priority determiner is further for determining the priorities of the subcells based on at least one of a frequency allocation policy of the wireless communication system, receive signal strengths of the subcells, cell loads of the subcells, and information about a frequency allocation for transmitting the information about the candidate subcells.

21. The base station of claim 18, wherein the message list generator is further for selecting at least one candidate subcell for each of the neighbor base stations when selecting candidate subcells from the subcells according to the determined priorities.

22. The base station of claim 18, wherein the transmitter unit comprises:
a message generator for generating a broadcast message that comprises the information about the candidate subcells; and
a transmitter for broadcasting the generated broadcast message to the coverage area.

23. The base station of claim 18, further comprising a priority controller for determining whether the priorities of the subcells are changed,
wherein the priority determiner is further for redetermining the priorities of the subcells when the priorities of the subcells are changed.

24. The base station of claim 18, further comprising a message processor for detecting information about the subcells included in the neighbor base station through a backbone network,
wherein the transmitter unit is further for extracting the information about the candidate subcells from information about subcells detected by the message processor, and transmitting the extracted information to the mobile station.

* * * * *